(Model.)
H. A. HOUSE & H. A. HOUSE, Jr.
WHEEL FOR ROLLER SKATES.
No. 328,119. Patented Oct. 13, 1885.
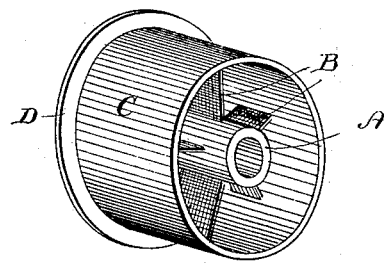
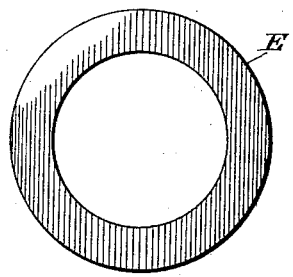 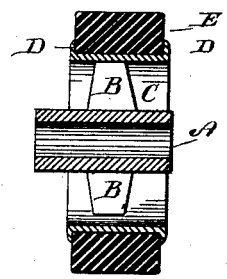
Witnesses
S. S. Williamson
W. T. Haviland
Inventors
Henry A. House
Henry A. House Jr.
By Smith & Hubbard
Attys.

UNITED STATES PATENT OFFICE.

HENRY A. HOUSE AND HENRY A. HOUSE, JR., OF BRIDGEPORT, CONN.

WHEEL FOR ROLLER-SKATES.

SPECIFICATION forming part of Letters Patent No. 328,119, dated October 13, 1885.

Application filed May 1, 1885. Serial No. 164,081. (Model.)

*To all whom it may concern:*

Be it known that we, HENRY A. HOUSE and HENRY A. HOUSE, Jr., citizens of the United States, residing at Bridgeport, in the county of Fairfield and State of Connecticut, have invented certain new and useful Improvements in Wheels for Roller-Skates; and we do hereby declare the following to be a full, clear, and exact description of the invention, such as will enable others skilled in the art to which it appertains to make and use the same.

Our invention relates to certain new and useful improvements in wheels for roller-skates, and has for its object to provide such a wheel as shall be light, easy running, and capable of retaining firm hold upon the skating surface; and with these ends in view our invention consists in the details of construction and combination of elements hereinafter fully explained, and then specifically designated by the claim.

In order that those skilled in the art to which our invention appertains may fully understand its construction, we will proceed to describe the same in detail, referring by letter to the accompanying drawings, forming a part of this specification, in which—

Figure 1 is a perspective of the hub, spokes, and felly of our wheel; Fig. 2, an elevation of the tire; Fig. ?, a central longitudinal section of the wheel.

Similar letters denote like parts in all figures.

The hub A, spokes B, and felly C, provided upon one edge with flange D, we preferably cast integral from brass or gun-metal.

E is the tire, which we prefer to make from vulcanized fiber, but any similar substance will answer equally as well. The tire is large enough so that by pressure or driving it may be fitted over the felly, and caused to abut against the flange D. Its width is such as to leave a margin of the felly as wide as the height of the flange, and this margin we then swage or spin up against the side of the tire to form a flange similar to the one cast upon the felly. In this manner a wheel possessing great strength is obtained. The tenacity and density of the fiber render it especially well adapted for the purposes of a tire, and its hold upon the floor is such that while rolling with great ease it does not readily slip or slide.

We are well aware that metallic skate-wheels having a tire or bearing-face of a substance adapted to hold upon the skating-surface have heretofore been made, and we do not desire to be understood as laying claim, broadly, to such a wheel, but only to the construction herein set forth.

Having thus described our invention, what we claim as new, and desire to secure by Letters Patent, is—

As a new article of manufacture, a roller-skate wheel the essential parts of which are the hub, spokes, and rim cast integral, and a solid tire of vulcanized fiber or other similar substance surrounding said rim and secured thereon by circumferential flanges at the sides of the latter and integral therewith, substantially as set forth.

In testimony whereof we affix our signatures in presence of two witnesses.

HENRY A. HOUSE.
HENRY A. HOUSE, JR.

Witnesses:
ROYAL E. HOUSE,
ARTHUR B. CORRIN.